(12) United States Patent
van Straten et al.

(10) Patent No.: US 6,183,800 B1
(45) Date of Patent: *Feb. 6, 2001

(54) METHOD FOR PREPARING FROTHED MILK OR CAFÉ CRÈME

(75) Inventors: Adrianus Petrus Matthijs van Straten, Linschoten; Jan Anne Muis, Odijk; Willem Nanko Mels, Utrecht; E. H. Rusche, Nieuwegein; A. J. Oude Wahsink, Utrecht, all of (NL)

(73) Assignee: Sara Lee/DE N.V., Utrecht (NL)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/162,970

(22) Filed: Sep. 29, 1998

(30) Foreign Application Priority Data

Sep. 30, 1997 (NL) .................................................. 1007167

(51) Int. Cl.$^7$ ....................................................... A23F 5/00
(52) U.S. Cl. .......................... 426/569; 426/587; 426/590; 426/594; 426/506; 426/432; 426/433; 99/300; 99/302 R; 99/323.3; 99/452; 137/889; 137/896; 336/163.2; 336/165.1
(58) Field of Search ................................. 426/569, 477, 426/432, 433, 587, 590, 506, 594; 99/300, 302 R, 323.1, 323.3, 452; 137/889, 896; 366/163.2, 165.1

(56) References Cited

U.S. PATENT DOCUMENTS

| | | | |
|---|---|---|---|
| 3,586,214 | * | 6/1971 | Diebel et al. . |
| 4,263,498 | * | 4/1981 | Meyers . |
| 4,595,131 | * | 6/1986 | Ruskin et al. . |
| 4,757,752 | * | 7/1988 | Robins et al. . |
| 4,852,473 | * | 8/1989 | Azpitarte Bolivar . |
| 5,052,289 | * | 10/1991 | Di Girolamo . |
| 5,154,111 | | 10/1992 | Luciano ............................. 99/289 R |
| 5,207,148 | * | 5/1993 | Anderson et al. ...................... 99/281 |
| 5,265,520 | * | 11/1993 | Giuliano ............................. 99/323.1 |
| 5,335,588 | * | 8/1994 | Mahlich . |
| 5,465,649 | * | 11/1995 | Muis . |
| 5,473,972 | * | 12/1995 | Rizzuto et al. . |
| 5,509,349 | * | 4/1996 | Anderson et al. ................... 99/323.1 |
| 5,549,036 | * | 8/1996 | Hourizadeh ........................... 99/286 |
| 5,611,262 | * | 3/1997 | Rizzuto et al. . |
| 5,773,067 | * | 6/1998 | Freychet et al. ...................... 426/506 |
| 5,884,552 | * | 3/1999 | Lüssi et al. .......................... 99/323.1 |
| 5,918,768 | * | 7/1999 | Ford . |
| 5,927,553 | * | 7/1999 | Ford . |

FOREIGN PATENT DOCUMENTS 9401096   1/1995 (NL) .

* cited by examiner

*Primary Examiner*—Cynthia L. Nessler
(74) *Attorney, Agent, or Firm*—Welsh & Katz, Ltd.

(57) ABSTRACT

According to the method for preparing frothed milk or café crème, milk concentrate or coffee concentrate is mixed with water, using a venturi chamber. The venturi chamber comprises a water inlet, a concentrate inlet and an outlet. Further, a whirl chamber, located downstream of the venturi chamber, is used, which is in fluid communication with the outlet. The water is supplied under pressure via the water inlet to the venturi chamber, so that a reduced pressure is created in the venturi chamber. The concentrate inlet is brought into fluid communication with a stock of milk or coffee concentrate, so that, as a result of the reduced pressure in the venturi chamber, via the concentrate inlet, milk or coffee concentrate is sucked into the venturi chamber. The milk or coffee concentrate and the water then flow together via the outlet to the whirl chamber, and the milk or coffee concentrate and the water are beaten in the whirl chamber to form frothed milk or café crème.

21 Claims, 9 Drawing Sheets

METHOD FOR PREPARING FROTHED MILK OR CAFÉ CRÈME

This invention relates to a method for preparing frothed milk or café crème, respectively.

The frothed milk is typically used for preparing cappuccino and similar beverages. The frothed milk then includes many small air bubbles.

café crème is understood to mean black coffee provided with a small-bubble, slightly light-brown colored froth layer when contained in a container such as a cup.

It is known to prepare frothed milk by mixing milk with steam. The mixing of the concentrated milk and steam can be carried out, for instance, manually. The milk is provided in a container, whereafter, using a steam pipe, steam is blown into the milk. While moving the container up and down by hand relative to the steam pipe, the steam and air are beaten into the milk. Thus, after some time, frothed milk will arise.

Further, it is known, for instance from European patent application 0,243,326, to prepare frothed milk using an emulsifying device. Using the emulsifying device, steam, air and milk are mixed with each other, such that frothed milk is obtained. To that end, the emulsifying device comprises a first steam inlet, an air inlet, a first milk inlet, a suction chamber and a whirl chamber. The first steam inlet, the air inlet and the first milk inlet open into the first suction chamber. Further, the first suction chamber is in fluid communication with the whirl chamber. The milk is contained in a storage container which is in fluid communication with the milk inlet via a duct. In use, steam is supplied via the steam inlet to the suction chamber. The result is that via the milk inlet, milk is sucked from the container to the suction chamber. Also, air is drawn in via the air inlet. The mixture of steam, air and milk flows to the whirl chamber at such a speed that in the whirl chamber, as a result of turbulence, frothed milk is formed. The frothed milk can then leave the device via an opening in the whirl chamber. To prevent the milk going bad, it is also known to cool the container in which the milk is contained. Often, the container of this milk consists of a small refrigerator in which a carton of milk with a contents of, for instance, 1 liter is stored.

A disadvantage of the first method described for preparing frothed milk is that it is rather laborious and takes up relatively much time. In the catering industry, especially the time required for preparing the frothed milk is unacceptable.

A disadvantage of the second method described for preparing frothed milk, which utilizes the emulsifier, is that when it is used in the catering industry, the carton of milk is often empty soon. The carton will then have to be replaced with another carton of milk, which again takes up an undesirable amount of time.

The object of the invention is to provide a method for preparing frothed milk, which provides a solution to each of the above-indicated disadvantages.

It is known per se to make café crème by spouting coffee at a high speed into a chamber surrounded by walls, which chamber is provided with an outflow opening at its underside. The chamber with the outflow opening is often designed as a piston which may further comprise a filter holder filled with ground coffee. A disadvantage of the known system is that it dispenses a café crème with an inhomogeneous froth layer. The object of the invention is also to provide a solution to the last-mentioned disadvantage.

The method for preparing a frothed milk or café crème, respectively, is characterized, according to the invention, in that milk concentrate or coffee concentrate, respectively, is mixed with water using a venturi chamber which comprises at least a water inlet, a concentrate inlet and an outlet, and a whirl chamber, located downstream of the venturi chamber, which is in fluid communication with the outlet, and the water is supplied under pressure via the water inlet to the venturi chamber, so that in the venturi chamber a reduced pressure is created, the concentrate inlet is brought into fluid communication with a stock of milk or coffee concentrate, respectively, so that, as a result of the reduced pressure in the venturi chamber, via the concentrate inlet, milk or coffee concentrate, respectively, is sucked into the venturi chamber, the milk or coffee concentrate, respectively, and the water flow together via the outlet to the whirl chamber, and the milk or coffee concentrate, 10 respectively, and the water are beaten, in the whirl chamber, to form frothed milk or café crème, respectively.

Surprisingly, it has been found possible to prepare frothed milk of very high quality with the aid of a venturi chamber which is in fluid communication with a downstream whirl chamber. The preparation of an amount of frothed milk takes up relatively little time. Also, owing to the use of a stock of concentrated milk as starting product, it takes relatively long for this entire stock to be used up. Especially when used in the catering industry, the advantage is that a carton of concentrated milk will be empty much less fast than a carton of ordinary milk.

It is noted that, as stated, European patent application 0,243,326 also discloses using a venturi chamber for preparing frothed milk. In that application, however, the starting products are milk and steam, instead of concentrated milk and water.

Further, it has been found, surprisingly, that according to the invention, using a venturi chamber and a whirl chamber, a perfect café crème can be prepared from concentrated coffee and water. The café crème is found to have a very homogeneous fine-bubble froth layer.

Preferably, also air is drawn in by the venturi chamber. This further enhances the fine-bubble character of the beverage to be prepared for consumption. In other words, more froth of a homogeneous quality is formed.

In particular, the stock of milk or coffee concentrate, respectively, is cooled. As a consequence, a very large amount of frothed milk or café crème, respectively, can be prepared, without the amount of milk or coffee concentrate needing to be replaced.

In particular, heated water is supplied to the first inlet for obtaining heated or hot frothed milk, or hot café crème.

Further, in particular the ratio between the amount of milk or coffee concentrate and the water supplied to the venturi chamber, as well as the temperature of the concentrated milk or coffee concentrate and the water, are tuned to each other, such that the frothed milk or the café crème, respectively, leaving the whirl chamber is hot. Here, preferably, the stock of milk or coffee concentrate is cooled, so that the temperature of the milk or coffee concentrate supplied to the venturi chamber is relatively low. In this connection, for instance, a temperature lower than 10° C. can be considered. It is also possible that the ratio between the amount of milk or coffee concentrate, respectively, and the water supplied to the venturi chamber, as well as the temperature of the milk or coffee concentrate, respectively, and the water are tuned to each other for predetermining the temperature of, respectively, the frothed milk or café crème leaving the whirl chamber.

European patent application 0,241,687 discloses mixing concentrates with water, using a venturi chamber. In particular, this involves fruit concentrates. A mixing chamber is used for mixing the water and the fruit concentrate. However, this does not involve the formation of froth in the finished product. Accordingly, European patent application 0,241,687 does not disclose supplying concentrated milk or concentrated coffee, respectively, and heated water to a whirl chamber for obtaining frothed milk or café crème, respectively.

BRIEF DESCRIPTION OF THE DRAWINGS

The invention will now be further explained with reference to the drawings, wherein:

FIG. 1b is a top plan view of the apparatus according to FIG. 1a;

FIG. 2e is a top plan view of the emulsifying assembly according to FIG. 2a;

FIG. 3a is a side elevation of a possible embodiment of an emulsifier of the emulsifying assembly according to FIG. 2a;

FIG. 3b is a partly broken away front view of the emulsifier according to FIG. 3a;

FIG. 3d is a top plan view of the emulsifier according to FIG. 3a;

FIG. 3e is a perspective view of the emulsifier of FIG. 3a;

FIG. 3f is a three-dimensional view of a partly exploded emulsifier according to FIG. 3a;

Figure 1A:
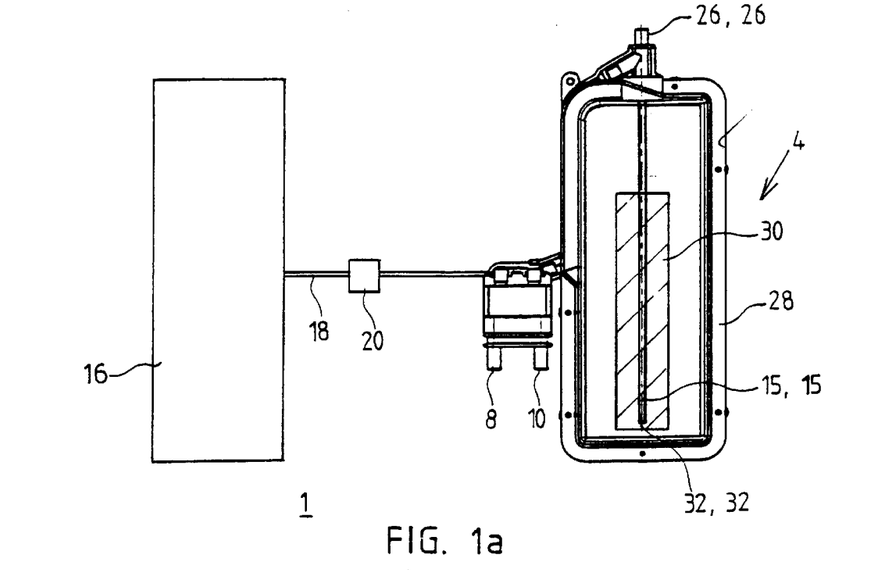
FIG. 1a is a side view of an apparatus for practising a method according to the invention.
Figure 1B:
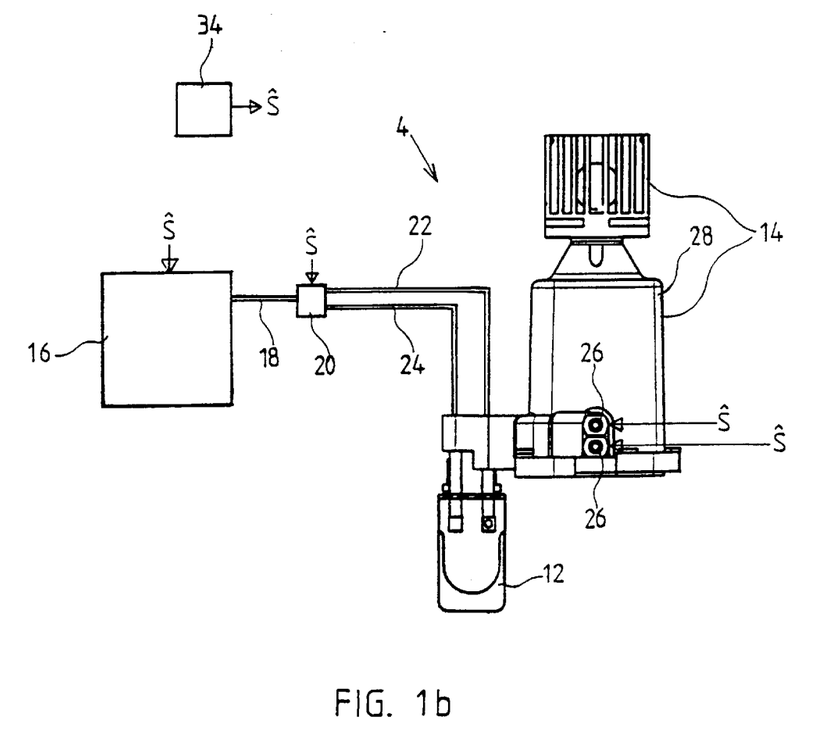

In FIG. 1, reference numeral 1 designates an apparatus for preparing frothed milk. This frothed milk can be used for preparing cappuccino and similar beverages. The apparatus comprises an emulsifying assembly 4 for preparing, as desired, heated frothed milk and heated non-frothed milk.

The emulsifying assembly 4 comprises a device 12 suitable for mixing, in accordance with the method of the invention, the water and concentrated milk for obtaining heated milk. In this example, the device 12 further comprises an air inlet for adding air to the concentrated milk for obtaining heated frothed milk. In this example, the device 12 consists of an emulsifier and accordingly will be designated hereinafter as emulsifier 12.

The emulsifying assembly 4 further comprises a cooling device 14 in which a container filled with concentrated milk container can be received for dispensing cooled concentrated milk from the stock of concentrated milk present in the container. The stock of concentrated milk has a temperature which is, for instance, lower than 10° C. This cooled concentrated milk is supplied via a first or second concentrate supply duct 15a, 15b, to be discussed hereinafter, to a first or second concentrate inlet of the emulsifier 12.

The emulsifying assembly further comprises a hot water generator 16 which dispenses hot water via a water duct 18 to a selection means 20. The selection means 20, being settable to that end, selectively dispenses the hot water generated by the hot water generator 16 and supplied via the water duct 18, to a first downstream duct 22 or a second downstream duct 24.

The first concentrate supply duct 15a further comprises an aeration valve 26a while the second concentrate supply duct 15b comprises an aeration valve 26b. The aeration valves 26a and 26b in this example are arranged on top of the cooling device 14. The cooling device 14 consists in this example of a cooling unit 28, which comprises a cooled space surrounded by chamber walls, in which space the above mentioned container of concentrated milk can be placed. This stock of concentrated milk is, for instance, a carton of concentrated milk 30, as shown in hatching in FIG. 1a. The concentrate supply ducts 15a and 15b comprise a second open end 32a, 32b which is in fluid communication with the concentrated milk contained in the concentrated milk carton 30. In this example, the two open ends 32a and 32b are situated nearly on the bottom of the carton of concentrated milk.

Finally, the emulsifying assembly further comprises a control unit 34 which generates control signals S and, through them, controls the hot water generator 16, the selection means 20 and the aeration valves 26a and 26b.

In this example, the walls of the cooling unit 28 are made substantially of a metal. The emulsifying assembly further comprises a cooling element 36 known per se, with which the walls of the cooling unit 28 can be cooled. A further elaboration of the cooling device 14 will now be discussed with reference to FIG. 2. The cooling unit 28 comprises a bottom wall 38, upright sidewalls 40a, 40b,40c, 40d, and a top wall 42. The sidewall 40d is detachably connected with the rest of the cooling unit 28 and can, for instance, be removed to place in the space 44 surrounded by the chamber walls 40a, 40b, 40c, 40d, 38 and 42 a milk-filled container in the form of a carton of concentrated milk 30.

Figure 2A:
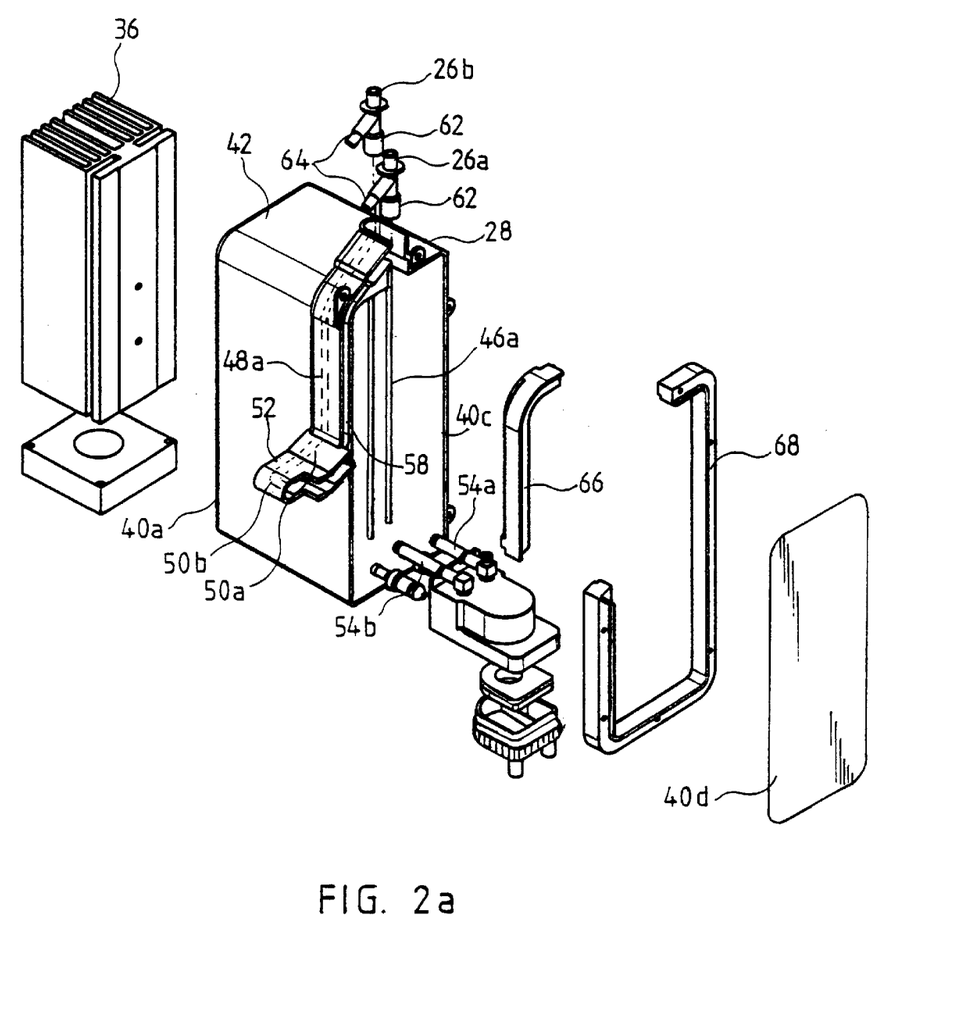
FIG. 2a is a perspective view of a partly exploded emulsifying assembly of the apparatus according to FIG. 1.
Figure 2B:
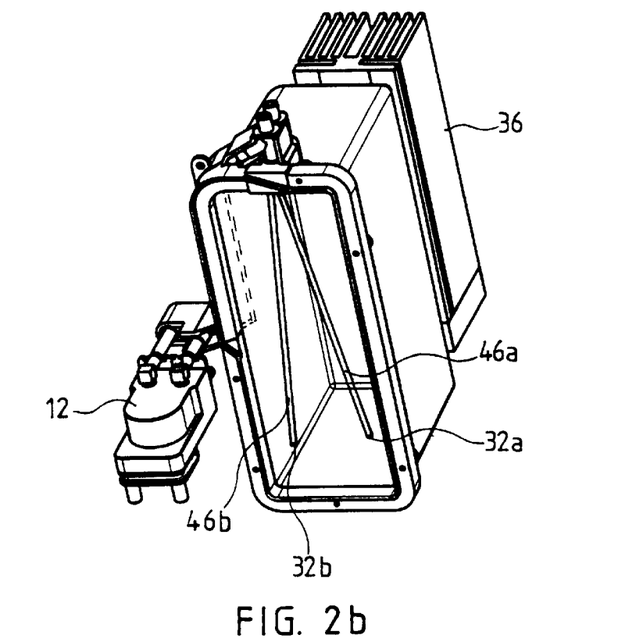
FIG. 2b is a three-dimensional view of the emulsifying assembly according to FIG. 2a, with a front wall removed.
Figure 2C:
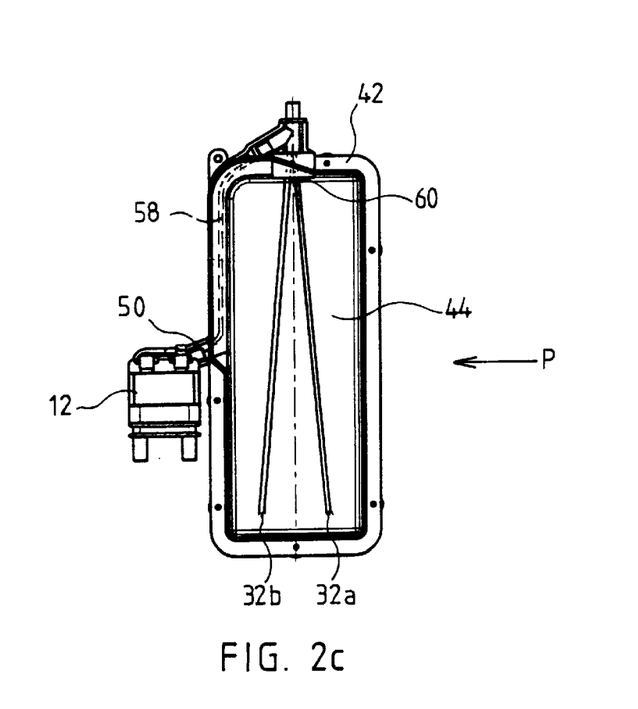
FIG. 2c is a front view of the emulsifying assembly according to FIG. 2b.
Figure 2D:
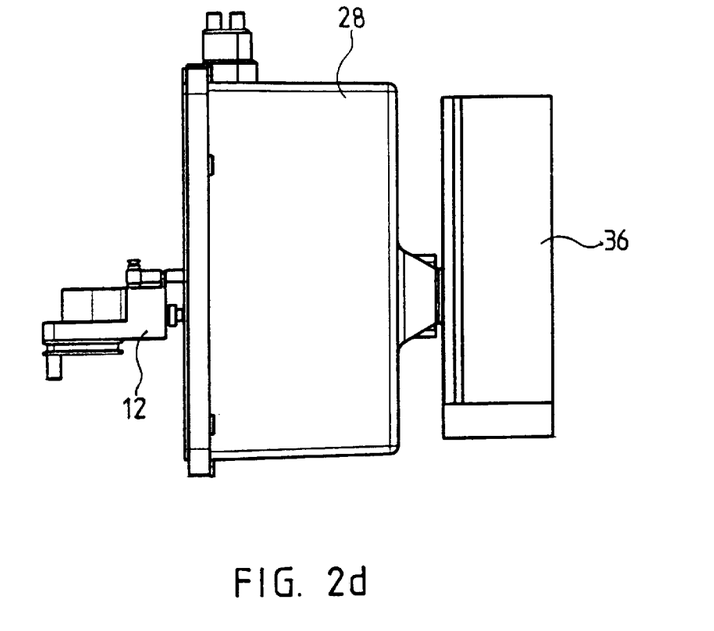
FIG. 2d is a side view in the direction of the arrow P of FIG. 2c.
Figure 2E:
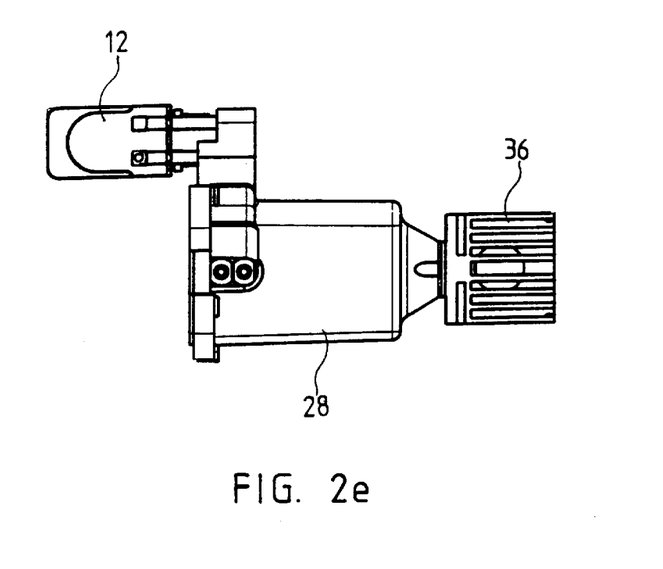

As can be suitably seen in FIGS. 2a, 2b and 2c, the first and second aeration valves 26a and 26b are arranged externally on the top wall 42. Extending vertically downwards from the first aeration valve 26a into the space 44 is a part 46a of the concentrate supply duct 15a. The part 46a of the concentrate supply duct is of flexible design, so that it can easily be manipulated in a carton of concentrated milk. Further, from the first aeration valve 26a a second part 48a of the concentrate supply duct 15a extends in a hollow space of the top wall 42 and the upright sidewall 40a. The upright sidewall 40a comprises externally thereof an outlet opening 50 through which the second part 48a of the duct 15a projects partly outside. The part of the duct 15a which projects outside ends in a first open end 50a. The open end 50a is situated in a holder 52 mounted on the upright sidewall 40a.

The first concentrate supply duct 15a accordingly comprises a first open end which, in this example, extends to a point outside the cooling unit 28, and a second open end situated in the interior 44 of the cooling unit 28. Since the first part of the concentrate supply duct 15a extends substantially within the space 44, while the second part 48a of the duct 15a extends substantially through a hollow space in the chamber walls, the first concentrate supply duct 15a extends substantially inside the cooling unit.

The second concentrate supply duct 15b together with the second aeration valve 26b is mounted in the cooling unit 28 in a manner entirely analogous to that discussed in relation to the concentrate supply duct 15a.

The emulsifier 12 comprises a first concentrate inlet 54a, a second concentrate inlet 54b, a first water inlet 56a and a second water inlet 56b. The emulsifier 12 comprises a housing which is detachably connected to the cooling unit 28, in this case in particular detachably connected to the holder 52. FIG. 2a shows the emulsifier 12 when detached from the cooling unit 28. The other figures of FIG. 2 show the emulsifier 12 when connected to the holder 52 of the cooling unit 28. In this last condition, the first open end 50a of the concentrate supply duct 15a is connected to the first concentrate inlet 54a. Also, the first open end 50b of the second concentrate supply duct 15b is connected to the second concentrate inlet 54b. The first water inlet 56a and the second water inlet 56b, in use, are connected to the first downstream duct 22 and the second downstream duct 24, respectively. See also FIG. 1. It is noted that the first and second concentrate inlet 54a, 54b of the emulsifier 12 are situated adjacent the cooling unit 28, so that the concentrate supply duct extends at least substantially completely inside the cooling unit (see also FIGS. 2b and 2c).

In this example, the first and second open end 50a and 50b of the concentrate supply ducts 15a and 15b are connected through a snap connection which is known per se to the first and second concentrate inlet 54a and 54b, respectively. The emulsifier 12 therefore can be pulled from the cooling unit, for instance to be cleaned, and subsequently be re-placed again.

FIG. 2a depicts the emulsifying assembly in partly disassembled condition. The hollow space extending in the top wall 42 and the sidewall 40a is designated with reference numeral 58. The top wall 42 is internally provided with an opening 60 through which the concentrate supply ducts 15a, 15b extend from the hollow space 58 in the wall 42 into the cooled space 44. In this example, the aeration valves 26a and 26b are assumed to be part of the concentrate supply ducts 15a and 15b. The opening 60 in this example extends from the inside of the cooling unit to the outside of the cooling unit (see FIG. 2a). These openings are closed again by the aeration valves when they are in assembled condition (see FIG. 2b). Each aeration valve comprises an inlet opening 62 and an outlet opening 64. The inlet openings 62 are respectively connected to the flexible parts 46a and 46b of the ducts 15a and 15b. The outlet openings 64 are connected to the parts 48a and 48b of the ducts 15a and 15b.

Because the hollow space 48, for the purpose of assembling the ducts, is open at the front of the cooling unit, the cooling unit further comprises a first insulating edge member 66 with which the hollow space 58 can be closed off. For the sake of symmetry, the cooling unit further comprises a second insulating edge member 68 which, in assembled condition, together with the first edge part, forms a closed ring. The concentrate supply ducts 15a and 15b are detachably connected to the rest of the assembly. By removing the first edge member 66, the concentrate supply ducts can be removed, for instance to clean or replace them. The upright sidewall 40d comprises means which are known per se, capable of detachably connecting it to the first and second edge member 66 and 68 to close off the cooling unit 28.

Accordingly, the edge member 40d constitutes a kind of door which can be opened to place a carton of concentrated milk in the space 28 and which can subsequently be closed.

The cooling element 36 is likewise detachably connected to the cooling unit 28. Additionally, arranged at the lower end of the cooling element is a fan which has the function of cooling the cooling element.

The walls of the cooling unit 28 are substantially made of a metal. The cooling element is mounted on the wall 40b (see FIGS. 2b–2e). The cooling element accordingly cools the upright sidewall 40b directly. Since all of the walls are made of metal and hence can conduct heat well, all of the walls will be cooled by the cooling element 36. The hollow space 58 will also be cooled. The duct parts 46a, 46b are obviously cooled because they are situated in the space 44. The holder 52 in this example is also made of metal, so that it is cooled too. This means that both concentrate supply ducts 15a and 15b in this example are cooled.

As appears from FIG. 2, the second ends 32a and 32b of the concentrate supply ducts 15a and 15b are situated at a level lower than the highest point of the respective concentrate supply ducts. The highest point of the concentrate supply ducts in this example is formed by the aeration valves 26a and 26b. Since the second ends 32a and 32b are situated below the highest points referred to, the carton of concentrated milk 30 cannot drain of itself when the aeration valves are opened. In this example, both concentrate supply ducts are of substantially U-shaped design and so oriented that each concentrate supply duct extends in upward direction from the first and the second end, respectively. In this example, the aeration valves 26a and 26b are arranged at the highest point of the concentrate supply ducts 15a and 15b, respectively.

If, with the aid of emulsifier 12, via the concentrate supply duct 15a or via the concentrate supply duct 15b milk is being sucked in, the supply duct 15a, 15b will be filled entirely with milk. When thereupon suction is stopped, the liquid flow in the concentrate supply duct 15a, 15b comes to a standstill and liquid residues will be left behind in this duct. Now, the important purpose of the aeration valve is to prevent this. By opening the aeration valve 26a, 26b, the duct 15a, 15b is aerated and residues of liquid can flow back to the carton of concentrated milk 30 or flow further to the emulsifier 12. It is noted that for this function of the aeration valve it is not relevant where exactly in the concentrate supply duct 15a, 15b it is arranged. In other words, for the purpose of this function, the aeration valve can, in principle, be arranged at any point of the concentrate supply duct 15a, 15b.

In some embodiments, however, it is also desired to avoid siphon action. When, as described hereinabove, it is attempted to stop the concentrated milk flow through a concentrate supply duct 15a, 15b by ending suction of concentrated milk using the emulsifier 12, it is possible that the concentrated milk flow, even after suction has been stopped, is not ended owing to siphon action. Siphon action can occur in particular when the first end 50a, 50b, viewed in vertical direction, is lower than the height of the liquid level in the carton of concentrated milk 30. By opening the aeration valve 26a, 26b, the concentrate supply duct 15a, 15b will be aerated and the siphon action ended. It is noted that for the purpose of this function not just any position of the aeration valve 15a, 15b is permitted. When the aeration valve 15a, 15b is situated in the part 48a, 48b of the duct 15a, 15b, the aeration valve should be disposed at a height which, in use, is above the level of the liquid surface in the carton of concentrated milk 30. If this were not the case, the concentrated milk would flow out via the aeration valve itself. If, on the other hand, the aeration valve is arranged in the flexible part 46a, 46b of the duct 15a, 15b, it should for the same reason be arranged above the level of the liquid surface. To properly fulfill both functions, the aeration valve will preferably be arranged at least at a level above the second end of the relevant concentrate supply duct. Ideally, however, as shown in FIG. 2, the aeration valve is disposed at the highest point of the concentrate supply duct in question, since it can then function properly at all times, regardless of the liquid level.

Referring to FIG. 3, now the emulsifier 12 will be further explained. The emulsifier, as already mentioned, comprises the first and second water inlet 56a and 56b and a first and second concentrate inlet 54a and 54b. The emulsifier further comprises an air inlet 72 which, in this example, is in direct communication with the first concentrate inlet 54a. This air inlet 72 further comprises a controllable valve 74 for controlling the magnitude of the air stream through the air inlet 72.

The emulsifier further comprises a first venturi chamber 76a and a second venturi chamber 76b. The first and second venturi chamber 76a and 76b are spatially separated from each other. The first water inlet 56a opens into the first venturi chamber 76a. The second water inlet 56b opens into the second venturi chamber 76b. The first concentrate inlet 54a and hence also the air inlet 72 likewise open into the first venturi chamber 76a. The second concentrate inlet 54b opens into the second venturi chamber 76b. Further, the first and second venturi chamber 76a, 76b are in fluid contact, via outlet 77a and 77b of the venturi chamber 76a and 76b, respectively, with a whirl chamber 78. The whirl chamber 78 comprises a bottom 80 which comprises an outlet in the form of an opening 82. Via this outlet 82, the whirl chamber 78 terminates in a distribution chamber 84 located under the mixing chamber. The distribution chamber 84 comprises a bottom with a first and second outflow channel 86a and 86b with, respectively, a first and a second outflow opening 88a, 88b.

Figure 3A:
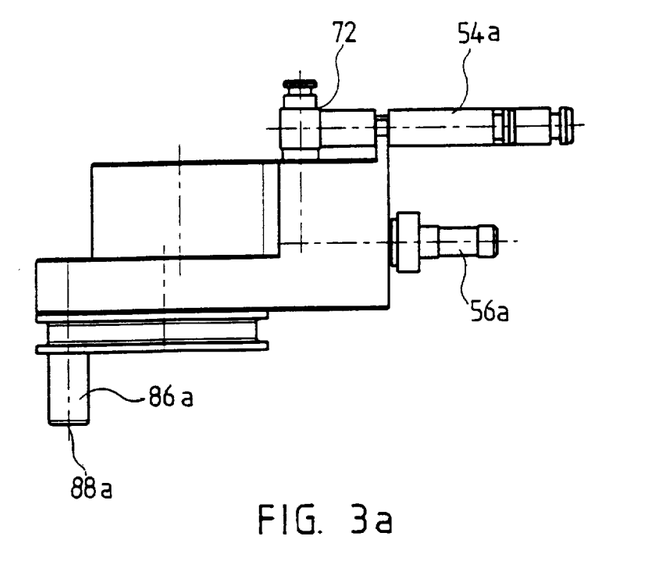
Figure 3B:
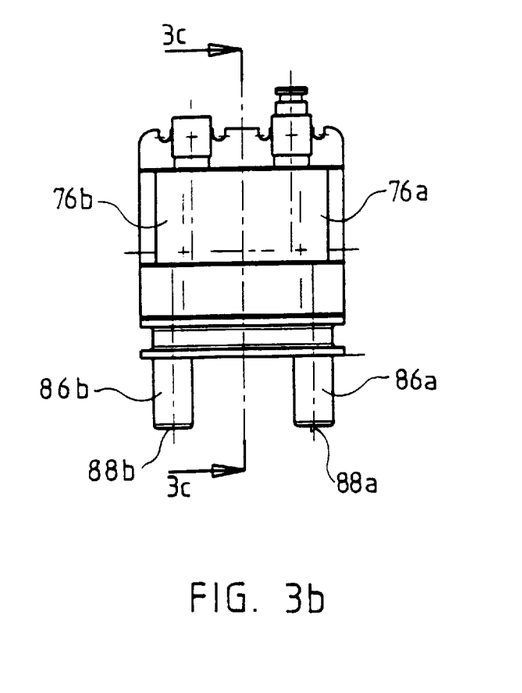
Figure 3C:
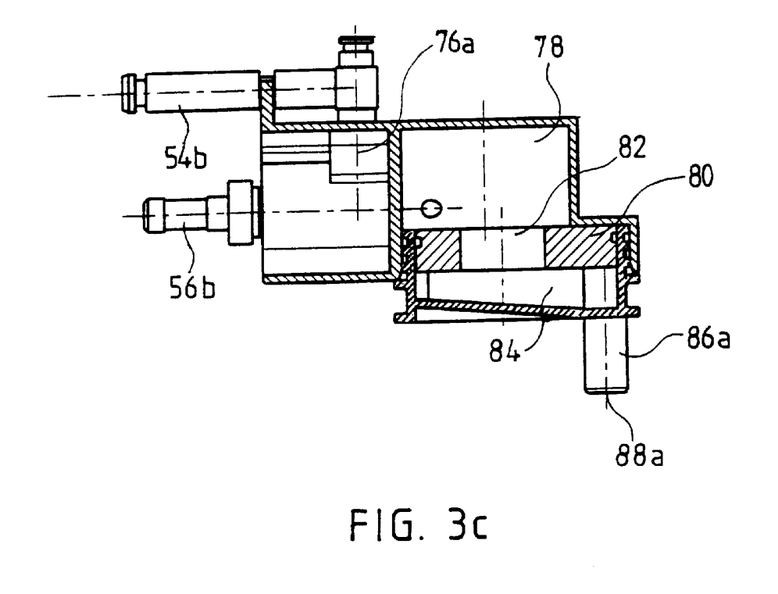
FIG. 3c is a cross section of the emulsifier taken on the line 3c—3c in FIG. 3b.
Figure 3D:
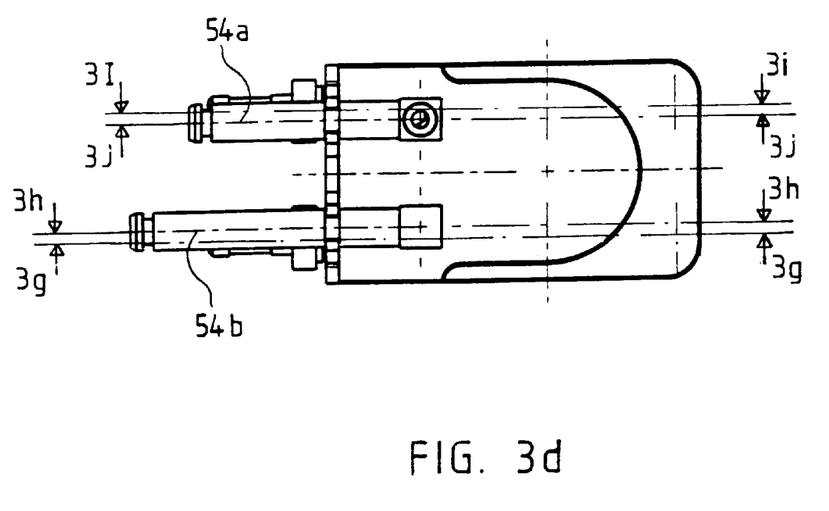
Figure 3E:
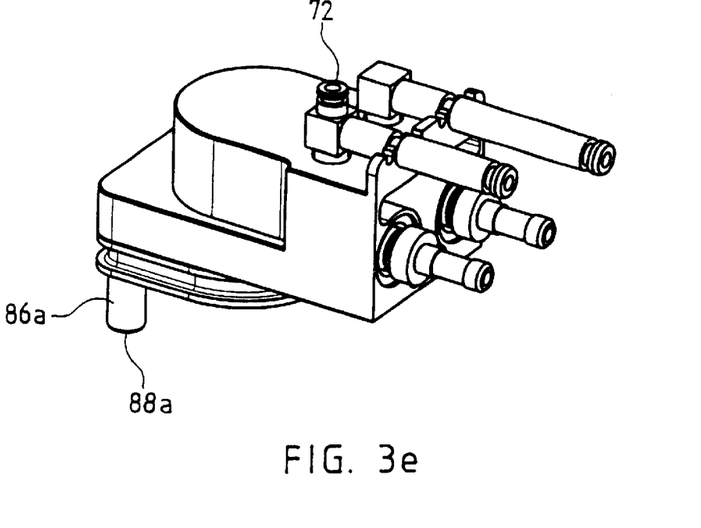
Figure 3F:
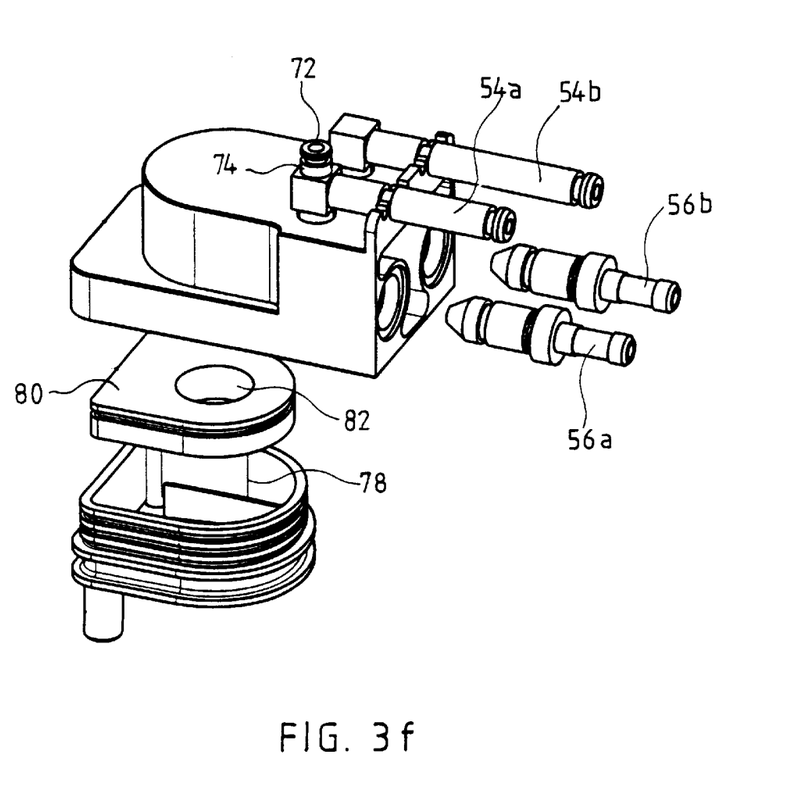
Figure 3G:
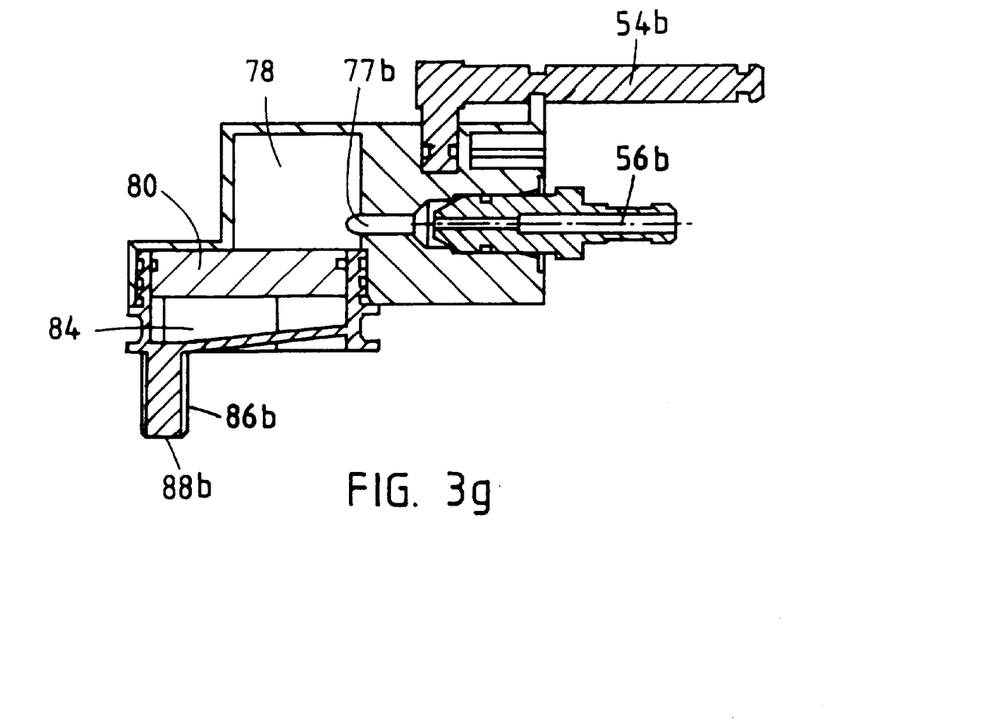
FIG. 3g is a first longitudinal section of the emulsifier, taken on the line 3g—3g in FIG. 3d.
Figure 3H:
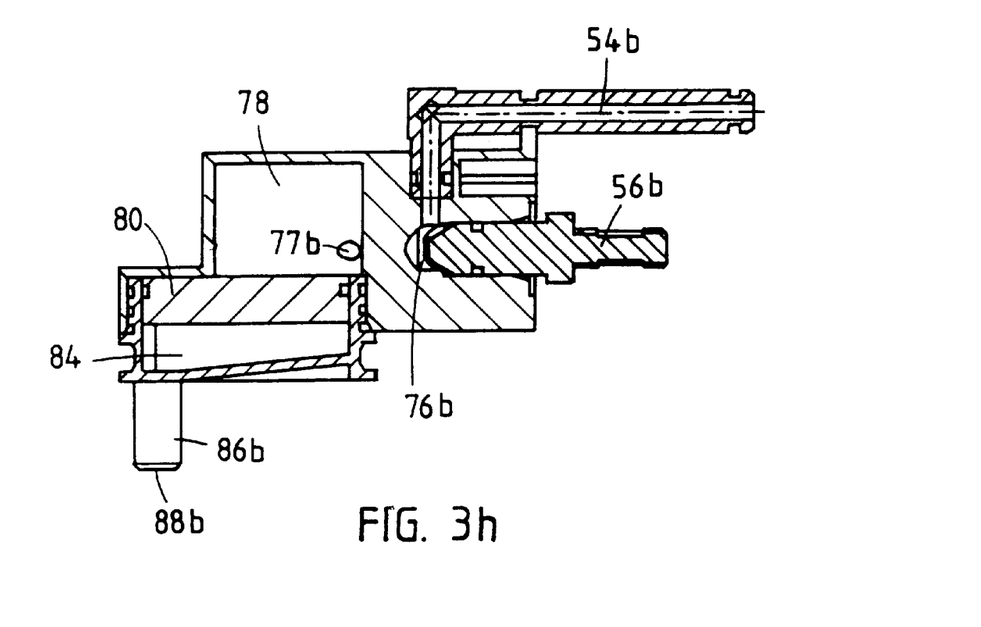
FIG. 3h is a second longitudinal section of the emulsifier, taken on the line 3h—3h in FIG. 3d.
Figure 3I:
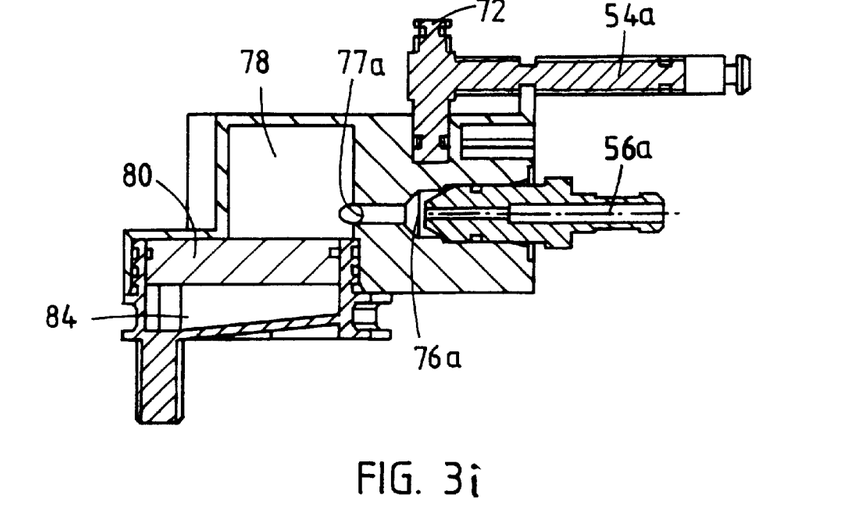
FIG. 3i is a third longitudinal section of the emulsifier, taken on the line 3i—3i in FIG. 3d.
Figure 3J:
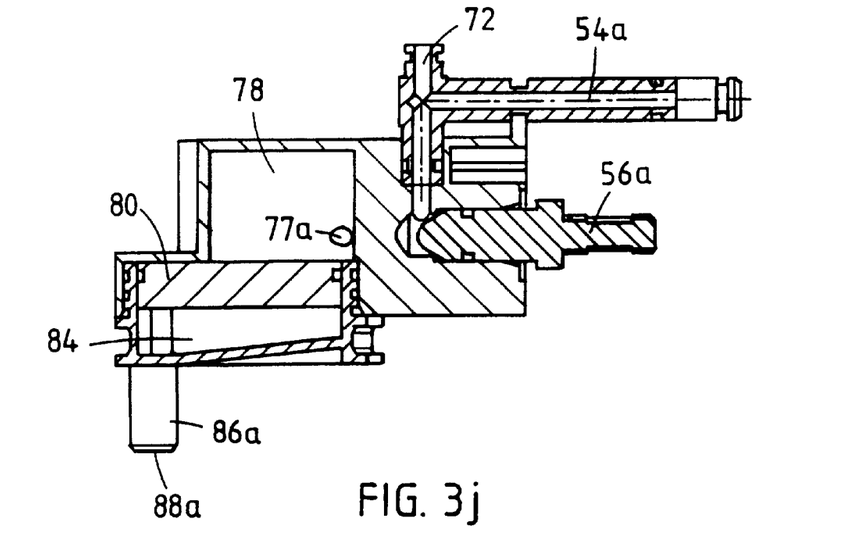
FIG. 3j is a fourth longitudinal section of the emulsifier, taken on the line 3j—3j in FIG. 3d.

As can be seen in FIG. 3f, the first and second concentrate inlet, the first and second water inlet, the whirl chamber 78, the distribution chamber 84 and the bottom 80 together with the other components of the emulsifier can be assembled from loose parts. However, this is not essential to the invention and only intended as an illustration of a possible embodiment.

The operation of the apparatus for carrying out the method according to the invention is as follows. It is preliminarily remarked that in this example the first and second outflow opening 88a and 88b of the emulsifier 12 are arranged in such mutual proximity that they can both dispense liquid directly into one cup. When it is presently the desire of the user to prepare frothed milk for a cup of cappuccino, the control unit 34 will activate the water generator 16 for preparing hot water. The heated water is supplied via the water duct 18 to the selection means 20. The control unit 34 controls the selection means 20, such that the water is supplied only to the first downstream duct 22. Accordingly, no water is supplied to the downstream duct 24. The result is that the first water inlet 56a of the emulsifier 12 is supplied with water. The water will end up in the first venturi chamber 76a. As a result, in this venturi chamber a reduced pressure will arise, since the venturi chamber 76a will function as a venturi system. The result is that the first venturi chamber 76a will draw concentrated milk and air via the concentrate inlet 54a and the air inlet 72, respectively.

The combination of concentrated milk, air and hot water will thereupon flow at a high velocity to the whirl chamber 78, where the ingredients in question are properly mixed with each other and are beaten to form froth. Here turbulent whirls occur in the whirl chamber. The bottom 80 with the opening 82 of the whirl chamber here functions as a "hold up" ensuring that the residence time of the mixture in the whirl chamber 78 is sufficiently long for the concentrated milk to be properly heated under the influence of the water and to form froth under the influence of the air. The end result is that frothed milk is supplied to the distribution chamber 84. This frothed milk will leave the distribution chamber via the outlet openings 88a and 88b and fill a cup placed under these outlet openings. To control the nature of the frothed milk, the air stream can, if desired, be adjusted via the controllable valve 74. This can be done manually.

According to the method carried out with the apparatus 1, therefore, in this example, using a venturi chamber, milk concentrate and water are brought together. Also, in this example, air is drawn in by the venturi chamber. The venturi chamber, which is in fluid communication with the whirl chamber, dispenses the concentrated milk, the hot water and the air to the whirl chamber at a high speed. In the whirl chamber, the milk concentrate and water, as a result of turbulent flow in the whirl chamber, are beaten to form frothed milk. The ratio between the amount of milk concentrate and the amount of water supplied to the venturi chamber 76a, as well as the temperature of the milk concentrate and the water, are tuned to each other, such that the frothed milk leaving the whirl chamber is warm. The frothed milk leaving the whirl chamber can have a temperature of, for instance, at least 50° C., while the concentrated milk supplied to the venturi chamber has a temperature of, for instance, 10° C. The ratio between the amount of milk concentrate and the amount of water supplied to the venturi chamber 76a is predetermined. This can be set, for instance, through a selection of the diameter of the supply ducts. It is also possible, however, to include controllable valves in one or more of the ducts 22, 24, 15a or 15b for setting the ratio referred to. It is also possible that the ratio between the amount of milk or coffee concentrate, respectively, and the water supplied to the venturi chamber, as well as the temperature of the milk or coffee concentrate, respectively, and the water are tuned to each other for predetermining the temperature of, respectively, the frothed milk or cafe creme leaving the whirl chamber.

When it is intended to prepare hot milk which expressly does not froth, the control unit 34 will again activate the hot water generator 16 as described hereinbefore. Now, however, the control unit 34 controls the selection means 20 such that the water is fed to the second downstream duct 24, while no water is fed to the first downstream duct 22. The result is that water is fed solely to the second water inlet 56b of the emulsifier 12. This water will flow to the second venturi chamber 76b. Thus, in the second venturi chamber 76b, which again functions as a venturi system, a reduced pressure will be generated, so that concentrated milk is drawn in via the second concentrate inlet 54b. Because the second venturi chamber 76b is separated from the first venturi chamber 76a, no air will be sucked to the second venturi chamber 76b. Accordingly, from the second venturi chamber 76b, a mixture of concentrated milk and hot water will flow to the whirl chamber 78. In the whirl chamber 78 too, no air will be sucked in via the air inlet 72, since in the whirl chamber 78 an excess pressure is created, so that it is not possible for liquid or air to flow from the first venturi chamber to the whirl chamber. In the whirl chamber 78 the concentrated milk is thereupon properly mixed with the hot water, the residence time of the concentrated milk in the whirl chamber being sufficient for a considerable heat transfer between the hot water and the concentrated milk. The bottom 80 together with the opening 82 here functions as a "hold up" again. The concentrated hot milk will thereupon flow to the distribution chamber 84 and leave the distribution chamber, divided over the outlet openings 88a and 88b. The cup which has been placed under the outlet openings 88a, 88b will therefore be filled with hot milk that does not froth.

If it is desired, with the apparatus described hereinbefore, to practise a method according to the invention for preparing café crème, the carton of concentrated milk 30 is replaced with a pack of concentrated coffee. For the preparation of café crème, the operation of the apparatus is entirely analogous to that of the apparatus as described for preparing frothed milk. This means, therefore, that the coffee concentrate and water are brought together with the aid of the venturi chamber 76a. Hot water is supplied under pressure via the first water inlet 56a to the venturi chamber 76a, so that in the venturi chamber 76a a reduced pressure is created. Because the first concentrate inlet 54a is brought into fluid communication with the stock of coffee concentrate accommodated in the pack 30, coffee concentrate is drawn via the first concentrate inlet 54a into the first venturi chamber 76a as a result of the reduced pressure in the first venturi chamber 76a. The coffee concentrate and the hot water flow together via the outlet 77a to the whirl chamber 78. Simultaneously, air is sucked in via the air inlet 72, by the venturi chamber 76a. This air likewise flows to the whirl chamber. Thus, in the whirl chamber, the coffee concentrate, the hot water and the air are beaten to form café crème.

It is noted that it is also possible to prepare ordinary coffee with the apparatus as described hereinbefore. In that case, the coffee concentrate is supplied to the second venturi chamber 76b, as has been described hereinbefore in relation to non-frothed milk. The method of preparation further proceeds entirely analogously. It is noted that the ratio between the amount of coffee concentrate and the water supplied to the venturi chamber, as well as the temperature of the coffee concentrate and the water can again be tuned to each other, such that the café crème leaving the whirl chamber has a predetermined temperature and is, for instance, warm. Here, too, the temperature of the café crème can be, for instance, at least 50° C., while the temperature of the coffee concentrate supplied to the venturi chamber is, for instance, 10° C.

The method according to the invention is not in any way limited to the embodiments outlined hereinbefore. Thus, it is also possible that, instead of hot water, non-heated water is supplied under pressure to the venturi chamber 76a or 76b. In that case, non-heated beverages ready for consumption are prepared.

Such variants are all understood to fall within the scope of the invention.

What is claimed is:

1. A method for preparing cafe cream, comprising the steps of mixing coffee concentrate with hot liquid water, creating a reduced pressure in a venturi chamber having a water inlet, a concentrate inlet and an outlet, and using a whirl chamber located downstream of the venturi chamber in fluid communication with the outlet, by supplying the hot liquid water under pressure via the water inlet to the venturi chamber, bringing the concentrate inlet into fluid communication with a coffee concentrate, and as a result of the reduced pressure in the venturi chamber, drawing the coffee concentrate into the venturi chamber, flowing the coffee concentrate and the hot liquid water together via the outlet to the whirl chamber.

2. A method according to claim 1, wherein air is drawn in by the venturi chamber.

3. A method according to claim 1, wherein the stock of coffee concentrate is cooled.

4. A method according to claim 3, wherein the stock of coffee concentrate is cooled to a temperature lower than 10° C.

5. A method according to claim 3, wherein cooled coffee concentrate is drawn into the venturi chamber.

6. A method according to claim 4, wherein cooled coffee concentrate is drawn into the venturi chamber.

7. A method according to claim 3, wherein the ratio between the amount of coffee concentrate and the hot liquid water supplied to the venturi chamber, as well as the temperature of the coffee concentrate and the hot liquid water, are tuned to each other, such that the coffee cream leaving the whirl chamber is warm.

8. A method according to claim 5, wherein the ratio between the amount of coffee concentrate and the hot liquid water supplied to the venturi chamber, as well as the temperature of the coffee concentrate and the hot liquid water, are tuned to each other, such that the coffee cream leaving the whirl chamber is warm.

9. A method according to claim 7, wherein the cafe creme leaving the whirl chamber has a temperature of at least 50° C.

10. A method according to claim 1, wherein the ratio between the amount of coffee concentrate and the hot liquid water supplied to the venturi chamber is predetermined.

11. A method according to claim 1, wherein the ratio between the amount of coffee concentrate and the hot liquid water supplied to the venturi chamber, as well as the temperature of the coffee concentrate and the hot liquid water are tuned to each other for predetermining the temperature of the cafe creme leaving the whirl chamber.

12. A method for preparing frothed milk, comprising the steps of mixing milk concentrate with hot liquid water, creating a reduced pressure in a venturi chamber having a water inlet, a concentrate inlet and an outlet, and using a whirl chamber located downstream of the venturi chamber and in fluid communication with the outlet, by supplying the hot liquid water under pressure via the water inlet to the venturi chamber, bringing the concentrate inlet into fluid communication with milk concentrate, and as a result of the reduced pressure in the venturi chamber, drawing the milk concentrate into the venturi chamber, flowing the milk concentrate and the hot liquid water together via the outlet to the whirl chamber.

13. A method according to claim 12, wherein air is drawn in by the venturi chamber.

14. A method according to claim 12, wherein the milk concentrate is cooled.

15. A method according to claim 14, wherein the milk concentrate is cooled to a temperature lower than 10° C.

16. A method according to claim 14, wherein cooled milk concentrate is drawn into the venturi chamber.

17. A method according to claim 15, wherein cooled milk concentrate is drawn into the venturi chamber.

18. A method according to claim 12, wherein the ratio between the amount of milk concentrate and the hot liquid water, are tuned to each other, such that the frothed milk, leaving the whirl chamber is warm.

19. A method according to claim 18, wherein the frothed milk, leaving the whirl chamber has a temperature of at least 50° C.

20. A method according to claim 12, wherein the ratio between the amount of milk concentrate and the hot liquid water supplied to the venturi chamber is predetermined.

21. A method according to claim 12, wherein the ratio between the amount of milk concentrate and the hot liquid water supplied to the venturi chamber, as well as the temperature of the milk concentrate and the hot liquid water are tuned to each other for predetermining the temperature of the frothed milk leaving the whirl chamber.

* * * * *